United States Patent
Hirata et al.

(10) Patent No.: US 8,430,991 B2
(45) Date of Patent: Apr. 30, 2013

(54) APPARATUS FOR PRODUCING NEAR FIELD OPTICAL HEAD

(75) Inventors: Masakazu Hirata, Chiba (JP); Manabu Oumi, Chiba (JP)

(73) Assignee: Seiko Instruments Inc. (JP)

( * ) Notice: Subject to any disclaimer, the term of this patent is extended or adjusted under 35 U.S.C. 154(b) by 800 days.

(21) Appl. No.: 11/583,179

(22) Filed: Oct. 19, 2006

(65) Prior Publication Data

US 2007/0034336 A1    Feb. 15, 2007

Related U.S. Application Data

(62) Division of application No. 10/452,533, filed on Jun. 2, 2003, now Pat. No. 7,132,055.

(30) Foreign Application Priority Data

Jun. 11, 2002 (JP) ................................. 2002-169955
May 8, 2003 (JP) ................................. 2003-129817

(51) Int. Cl.
    *C23F 1/00*    (2006.01)
(52) U.S. Cl.
    USPC ...... 156/345.15; 205/641; 205/644; 205/643; 205/345
(58) Field of Classification Search ............. 156/345.15, 156/345.16, 345.13, 345; 205/643, 641, 205/644, 345
    See application file for complete search history.

(56) References Cited

U.S. PATENT DOCUMENTS

| | | | |
|---|---|---|---|
| 3,953,265 A * | 4/1976 | Hood | 438/8 |
| 4,351,706 A * | 9/1982 | Chappell et al. | 205/655 |
| 4,755,442 A * | 7/1988 | Hasebe et al. | 430/30 |
| 4,995,939 A * | 2/1991 | Ferenczi et al. | 205/791 |
| 5,516,399 A * | 5/1996 | Balconi-Lamica et al. | 438/8 |
| 6,593,759 B2 * | 7/2003 | Gilton | 324/718 |
| 2005/0006027 A1 * | 1/2005 | Li et al. | 156/345.15 |
| 2007/0034336 A1 * | 2/2007 | Hirata et al. | 156/345.15 |

OTHER PUBLICATIONS

Patent Abstracts of Japan, publication No. 11-265520, publication date Sep. 28, 1999.
Patent Abstracts of Japan, publication No. 2001-034981, publication date Feb. 9, 2001.

* cited by examiner

*Primary Examiner* — Sylvia R. MacArthur
(74) *Attorney, Agent, or Firm* — Adams & Wilks (57) ABSTRACT

A production apparatus is provided for producing a near field optical head that includes, during its production process, a substrate, at least one protuberance extending from a surface of the substrate, an electrically conductive shielding film covering the protuberance and the substrate, and a parent film, as a mother material for an air bearing, covering the shielding film. The production apparatus has an etchant for etching the parent film and a container for storing the etchant and for containing the substrate, the shielding film, and the parent film so that the substrate, the shielding film, and the parent film are immersed in the etchant. At least one electrode is fixedly mounted in the container so as to be immersed in the etchant. A measuring device measures an electrical characteristic between the electrode and the shielding film.

18 Claims, 8 Drawing Sheets

FIG. 8 PIROR ART

APPARATUS FOR PRODUCING NEAR FIELD OPTICAL HEAD

CROSS REFERENCE TO RELATED APPLICATION

The present application is a division of prior U.S. application Ser. No. 10/452,533, filed on Jun. 2, 2003, now U.S. Pat. No. 7,132,055 which is hereby incorporated by reference, and priority thereto for common subject matter is hereby claimed.

BACKGROUND OF THE INVENTION

1. Field of the Invention

This invention relates to a method of, and an apparatus for, producing a near field optical head.

2. Description of the Related Art

A near field optical device has been presently utilized as a near field optical head of an information recording/reproducing apparatus or as a probe for optically observing a sample, and studies of its utilization have also been conducted.

A capacity of an information recording/reproducing apparatus using light has been increased while it scale has been decreased, and a higher density of a recording capacity has been required. To satisfy the requirements, studies have been made by use of blue violet semiconductor laser. However, these technologies may improve only several times the present recording density because of the diffraction limit of light. In contrast, an information recording/reproducing method utilizing near field light is expected as a technology handling optical information in a fine region exceeding the diffraction limit of light.

This technology utilizes near field light generated in the proximity of an optical aperture having a size smaller than a wavelength of light and formed in a near field optical head as a near field optical device. To reproduce optical information, it is possible to employ a method (illumination mode) that irradiates near field light generated from the fine aperture to a surface of a recording medium, and detects scattered light converted by an interaction with the surface of the recording medium on which a fine concavo-convexity recording information and optical constants such as a refractive index change, through a light reception device arranged separately. Near field light locally existing on the recording medium can be utilized, too. A method (collection mode method) that irradiates light to the surface of the recording medium and converts near field light locally existing at fine marks on the recording medium to scattered light through the interaction with the fine aperture and the fine protuberance can be employed as a reproduction method of optical information. In consequence, it becomes possible to handle optical information in a region below the wavelength of light that has been the limit in the optical system according to the prior art. To record information, a method that irradiates near field light generated from the fine aperture to the surface of the recording medium and changes the shape of the fine region on the medium (heat mode recording) and a method that changes a refractive index or a transmittance of the fine region (photon mode recording) can be used. A higher density than that of the information recording/reproducing apparatus of the prior art can be accomplished by using the near field optical head having the optical fine aperture or fine protuberance exceeding the diffraction limit of light.

Generally, the construction of the recording/reproducing apparatus utilizing near field light is substantially the same as the construction of magnetic disk apparatuses with the exception that a near field optical head is used in place of a magnetic head. The near field optical head fitted to a distal end of a suspension arm and having an optical fine aperture or fine protuberance is allowed to float to a predetermined height by use of a flying head technology using an air bearing to gain access to an arbitrary data mark existing on a disk. To let the near field optical head follow the disk rotating at a high speed, a flexure function is provided for stabilizing the posture in such a fashion as to correspond to swelling of the disk (refer, for example to Patent Reference 1).

Generally, optical resolution of a recording/reproducing apparatus utilizing near field light greatly depends on a proximity distance. Therefore, in the near field optical head of such an apparatus, the optical fine aperture or fine protuberance is formed to a height substantially equal to that of an air bearing surface, and the optical fine aperture or fine protuberance is brought close to the medium by a distance approximate to the floating distance of the near field optical head to acquire high optical resolution (refer, for example, to Patent Reference 2).

Figure 8:
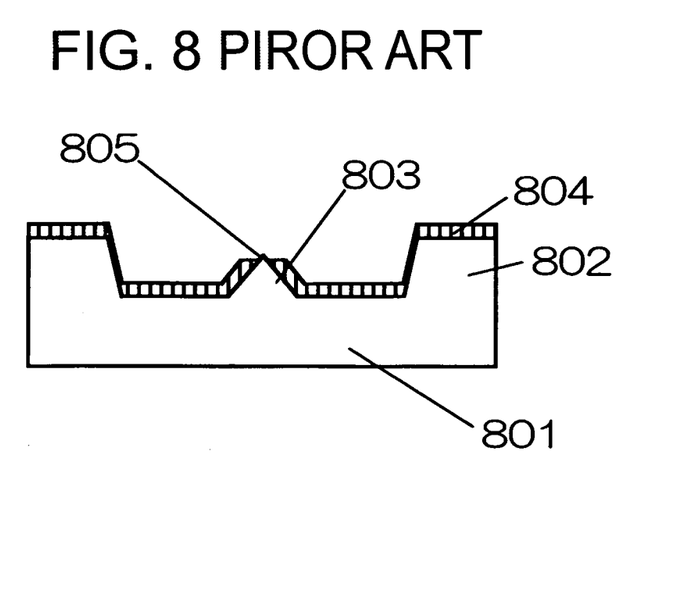
FIG. 8 is a sectional view showing a construction of a near field optical head according to the prior art.

FIG. 8 shows a section of a near field optical head having the optical fine aperture produced according to a prior art method. A protuberance 803 and an air bearing 802 are formed on a substrate 801, and a shielding film 804 is formed on them. A distal end of the protuberance 803 is exposed from the shielding film 804 to form an optical fine aperture 805. The substrate 801 uses a dielectric having a high transmittance in a visible ray range such as quartz glass or diamond, a dielectric having a high transmittance in an infrared ray range such as zinc selenium or silicon, or a material having a high transmittance in a ultraviolet ray range such as magnesium fluoride or calcium fluoride. The shielding film 804 uses a metal such as aluminum, chromium, gold, platinum, silver, copper, titanium, tungsten, nickel or cobalt, or its alloy. The thickness of the shielding film 804 varies with its material but is from dozens to hundreds of nm. The protuberance 803 and the air bearing 802 can be collectively formed through etching technology of the substrate 801. The shielding film can be formed by use of a sputtering method or a vacuum deposition method and the like. To partially remove the apex of the protuberance of the shielding film 804 when forming the optical fine aperture 805, a method that uses a focused ion beam (FIB) (refer, for example, to Patent Reference 2) or a method that pushes a hard flat sheet to the apex of the protuberance and allows the shielding film 804 to undergo plastic deformation (refer, for example, to Patent Reference 3) can be employed.

The near field optical head using the fine protuberance, too, has been produced by a method substantially the same as the methods described above with the exception that the shielding film and the aperture are not formed.

Patent Reference 1: JP-A-2001-34981 (page 4, FIG. 1)

Patent Reference 2: JP-A-11-265520 (pages 6 to 7, FIG. 10)

Patent Reference 3: JP-B-21201 (pages 3 to 4, FIG. 5)

However, the production method of the near field optical head described above collectively forms the protuberance and the air bearing by etching and may therefore seem efficient at first sight. However, because an etching rate of the protuberance is different from that of the air bearing when forming them, it is difficult to simultaneously process the protuberance and the air bearing and to form the distal end of the protuberance and the surface of the air bearing on substantially the same plane. The protuberance has a greater etching rate due to its three-dimensional shape than the air bearing. Therefore, when the air bearing attains a predetermined height, the height of the protuberance is lower than that of the air bearing. When the protuberance is used as the near field optical head, it is not possible to bring the aperture and the protuberance sufficiently close to the medium. In consequence, optical resolution drops.

When etching is conducted to form the protuberance and the air bearing in the prior art methods, sensing of the etching amount is not made during etching but the etching amount is controlled only through the time control, and is measured after etching is once stopped. However, precise control of the etching amount through time control is difficult due to the changes of a density distribution and a density of an etchant. On the other hand, repetition of the measurement of the etching amount by interrupting the etching process invites the increase of the process steps and is not suitable for mass-production of near field optical heads having high quality.

On the contrary, it may be possible to form the air bearing by an additional processing such as deposition of a film, but it is difficult to form the surface of the air bearing and the distal end of the protuberance on substantially the same plane. For, it is difficult to accurately control the film thickness when the film is deposited.

As to the formation of the aperture, the prior art methods such as the method that uses FIB and the method that pushes the flat sheet are not efficient and are not entirely effective for mass-producing the near field optical heads having high quality.

SUMMARY OF THE INVENTION

It is an object of the invention to eliminate the problems described above in connection with the conventional art by providing an improved near field optical head and production method thereof.

According to a first aspect of the invention, there is provided a production method of a near field optical head comprising the steps of forming a parent film for air bearing on one of surfaces of a substrate having a protuberance in such a fashion as to cover the protuberance; etching the parent film for air bearing; detecting exposure of the protuberance; stopping etching of the parent film for air bearing; and processing the parent film for air bearing.

In the first aspect described above, a second aspect of the invention provides a production method of a near field optical head which further comprises the step of stopping etching of the parent film for air bearing and conducting separately at least once additional etching of the parent film for air bearing before processing of the parent film for air bearing.

According to a third aspect of the invention, there is provided a production method of a near field optical head comprising the steps of forming a shielding film on one of surfaces of a transparent substrate having a protuberance; forming a parent film for air bearing on the shielding film in such a fashion as to cover the shielding film on the protuberance; etching the parent film for air bearing; detecting exposure of the shielding film; stopping etching of the parent film for air bearing; processing the shielding film; and exposing an apex of the protuberance and forming an optical aperture.

In the third aspect described above, a fourth aspect of the invention provides a production method of a near field optical head, which further comprises the steps of stopping etching of the parent film for air bearing; conducting separately additional etching of the parent film for air bearing; etching separately the shielding film with the parent film for air bearing as an etching mask; and exposing the apex of the protuberance and forming the optical aperture.

In the third aspect described above, a fifth aspect of the invention provides a production method of producing a near field optical head, which further comprises the steps of stopping etching of the parent film for air bearing; processing the parent film for air bearing; covering the shielding film on the protuberance and a part of the parent film for air bearing with a substantially flat sheet; allowing at least a part of the flat sheet to undergo deformation with the parent film for air bearing as a stopper to thereby bring the part into contact with the apex of the shielding film on the protuberance; and exposing the apex of the protuberance and forming the optical aperture.

In the third aspect described above, a sixth aspect of the invention provides a production method of a near field optical head, which further comprises the steps of stopping etching of the parent film for air bearing; conducting separately additional etching of the parent film for air bearing; covering the shielding film on the protuberance and a part of the parent film for air bearing with a substantially flat sheet; allowing at least a part of the flat sheet to undergo deformation with the parent film for air bearing as a stopper to thereby bring the part into contact with the apex of the shielding film on the protuberance; and exposing the apex of the protuberance and forming the optical aperture.

In the first or second aspect described above, a seventh aspect of the invention provides a production method of a near field optical head, wherein the substrate has a plurality of the protuberances, and the production method further comprises the steps of independently detecting exposure of each of the protuberances; and independently stopping etching of the parent film for air bearing as to the exposed portion of the protuberance so detected.

In any of the third to sixth aspects described above, an eighth aspect of the invention provides a production method of a near field optical head, wherein the substrate has a plurality of protuberances, and the production method further comprises the steps of independently detecting exposure of each of the shielding film; and independently stopping etching of the parent film for air bearing as to the exposed portion of the shielding film so detected.

According to a ninth aspect of the invention, there is provided a production apparatus of a near field optical head including a substrate, a protuberance on one of surfaces of the substrate, an electrically conductive shielding film covering the protuberance and the substrate other than an optical aperture in the proximity of an apex of the protuberance, and an air bearing, the production apparatus comprising an etchant for etching a parent film for air bearing as a mother material of the air bearing, covering the shielding film; a container for storing the etchant; an electrode fixed inside the etchant; and an ohmmeter for measuring electric resistance between the electrode and the shielding film.

According to a tenth aspect of the invention, there is provided a production apparatus of a near field optical head including a substrate, a protuberance on one of surfaces of the substrate, an electrically conductive shielding film covering the protuberance and the substrate other than an optical aperture in the proximity of an apex of the protuberance, and an air bearing, the production apparatus comprising an etchant for etching a parent film for air bearing as a mother material of the air bearing, covering the shielding film; a container for storing the etchant; an electrode fixed inside the etchant; and an impedance meter for measuring impedance between the electrode and the shielding film.

In the tenth aspect described above, an eleventh aspect of the invention provides a production apparatus of a near field optical head, which further comprises a mechanism for stopping etching on the basis of impedance measured by the impedance meter.

According to a twelfth aspect of the invention, there is provided a production apparatus of a near field optical head including a substrate, a protuberance on one of surfaces of the substrate, a shielding film covering the protuberance and the substrate other than an optical aperture in the proximity of an apex of the protuberance, and an air bearing, the production apparatus comprising an etchant for etching an parent film for air bearing as a mother material of the air bearing, covering the shielding film; a container for storing the etchant; a laser beam source for irradiating the parent film for air bearing; and an optical detector for detecting scattered beams originating from the laser beam source.

In the twelfth aspect described above, a thirteenth aspect of the invention provides a production apparatus of a near field optical head, which further comprises a mechanism for stopping etching on the basis of the scattered beam detected by the optical detector.

In any of the ninth to thirteenth aspects described above, a fourteenth aspect of the invention provides a production apparatus of a near field optical head, which further comprises a cover for fixing a work including the substrate, the protuberance the shielding film and the parent film for air bearing into the etchant, and for preventing etching of surfaces other a work object surface of the work.

In any of the ninth to eleventh or fourteenth aspect described above, a fifteenth aspect of the invention provides a production apparatus of a near field optical head, which further comprises a plurality of electrodes respectively opposing the plurality of protuberances.

Because the inventions described above can control more precisely and more easily than ever a height difference between the optical aperture or the protuberance and the air bearing surface, the inventions can produce near field optical heads having uniform quality at a higher speed and a lower cost. Because the inventions can precisely grasp a predetermined etching amount during etching of an parent film for air bearing by use of a production apparatus of a near field optical head, for example, the inventions can precisely and easily set the height difference between the apex at the distal end of the aperture and the air bearing surface to about the thickness of the shielding film.

DETAILED DESCRIPTION OF THE PREFERRED EMBODIMENTS

Preferred embodiments of the invention will be hereinafter explained with reference to the accompanying drawings.

[Embodiment 1]

FIG. 1 is a sectional view showing a production method of a near field optical head according to Embodiment 1 of the invention.

Figure 1A:
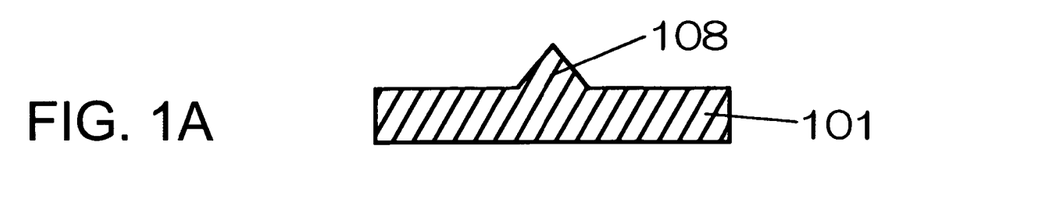
FIG. 1 is a sectional view showing a production method of a near field optical head according to Embodiment 1 of the invention.

FIG. 1A shows a state after a protuberance 108 is formed on an upper surface of an optically transparent substrate 101. The substrate 101 uses a dielectric material having a high transmittance in a visible ray region such as quartz glass or diamond, a dielectric material having a high transmittance in an infrared ray region such as zinc selenium or silicon, or a material having a high transmittance in a ultraviolet ray region such as magnesium fluoride or calcium fluoride. When a quartz glass substrate is used as the substrate 101, the protuberance 108 can be formed by isotropically etching the quartz glass by use of a patterned resist as an etching mask and a mixed solution of hydrofluoric acid and ammonium fluoride.

Figure 1B:
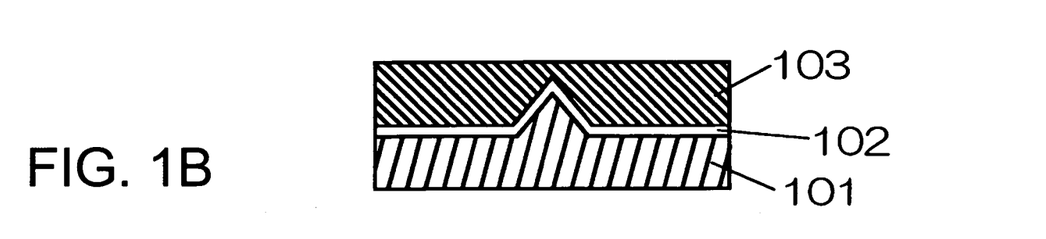

Next, a shielding film 102 is deposited onto the substrate 101 and the protuberance 108. The thickness of the shielding film 102 varies with the material of the shielding film 102 but is from dozens to hundreds of nm. The shielding film 102 but is from dozens to hundreds of nm. The shielding film 102 has electric conductivity. A base or parent film for an air bearing surface (hereinafter "air bearing") 103 is deposited onto the shielding film 102. The parent film for air bearing 103 does not have electric conductivity. The thickness of the parent film for air bearing 103 should be sufficiently greater than the sum of the height of the protuberance 108 and the thickness of the shielding film 102. The surface of the parent film for air bearing 103 is thereafter polished to eliminate any concavo-convexity originating from the protuberance 108. FIG. 1B shows the state after the surface of the parent film for air bearing 103 is polished.

Figure 1C:
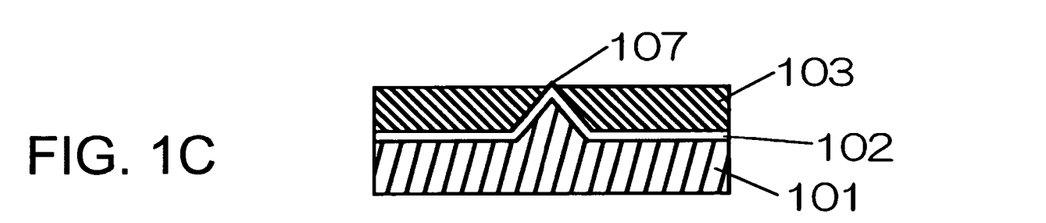

Next, the parent film for air bearing 103 is etched. As etching of the parent film for air bearing 103 proceeds, the protuberance of the shielding film 102 is exposed, forming an exposed portion 107 as shown in FIG. 1C. Consequently, the surface of the parent film for air bearing 103 etched and the exposed portion 107, that is, the apex of the shielding film 102, exist on substantially the same plane. Etching of the parent film for air bearing 103 is carried out while existence/absence of the formation of the exposed portion 107 is monitored. This step is the most important step in the invention and will be explained later.

Figure 1D:
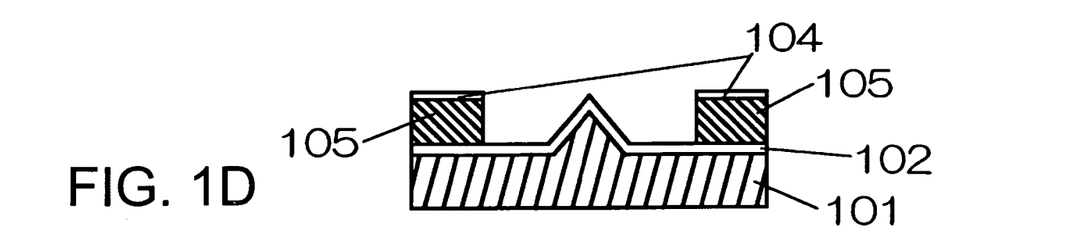

After the exposed portion 107 is formed, the parent film for air bearing 103 is processed to form an air bearing 105 as shown in FIG. 1D. Photo-fabrication may be employed to process the parent film for air bearing 103. The parent film for air bearing 103 can be etched with the patterned resist 104 as the etching mask to form the air bearing 105 by use of an etching method that does not deteriorate the function of the shielding film 102.

Figure 1E:
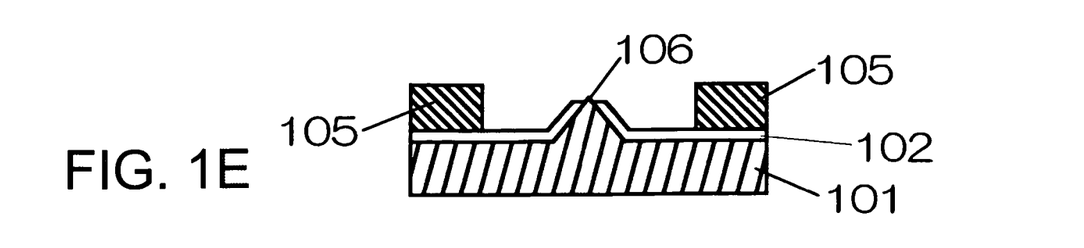

After the resist 104 is removed, the apex of the protuberance of the shielding film 102 is partially removed to optically expose the apex of the protuberance 108, forming an aperture 106 as shown in FIG. 1E. In this way, a near field optical head is completed. The size of the aperture 106 is from several nm to the limit of diffraction of the wavelength of the rays of light passing through the substrate 101 and through the protuberance 108. To partially remove the apex of the protuberance of the shielding film 102, it is possible to employ a method using a focused ion beam (FIB) or a method that pushes a hard flat sheet to the apex of the protuberance of the shielding film 102 and allows the shielding film 102 to undergo plastic deformation.

Figure 6:
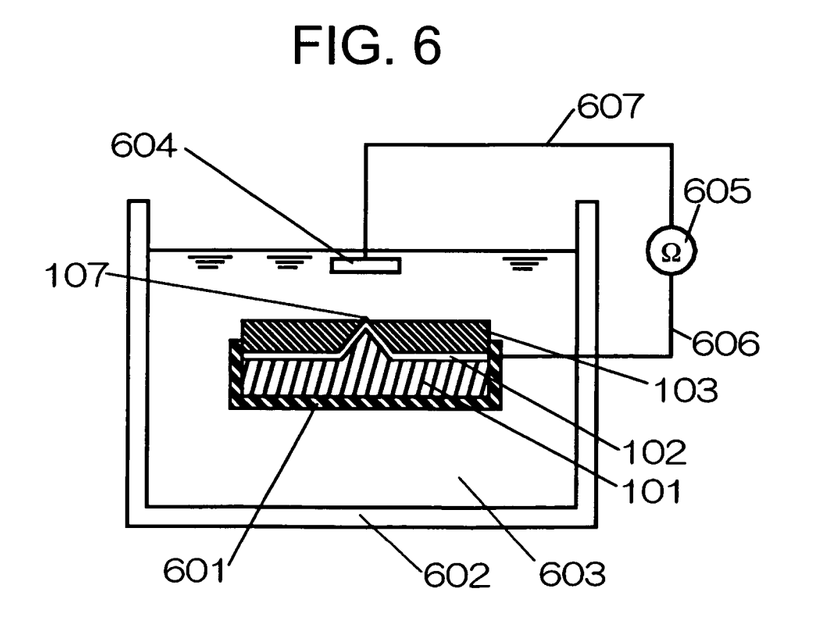
FIG. 6 is a schematic view showing a construction of a production apparatus of a near field optical head according to the invention.

The step shown in FIG. 1C will be hereby explained in detail with reference to FIG. 6. As described above, the parent film for air bearing 103 is etched in this step, and a production apparatus of a near field optical head shown in FIG. 6 is used for this etching. An etching tank 602 is filled with an etchant 603 for etching the parent film for air bearing 103. The etchant 603 has electric conductivity. A work including the substrate 101, the shielding film 102 and the parent film for air bearing 103 is immersed into the etchant 603. Since the substrate 101 and the shielding film 102 are covered with a cover 601, however, they are not exposed to the etchant 603 but only the parent film for air bearing 103 is exposed to the etchant 603. Furthermore, since the substrate 101 and the shielding film 102 are covered with the cover 601 and since the cover 601 does not have electric conductivity, the substrate 101 and the shielding film 102 are electrically isolated from the etchant 603. A covered wire 606 is fitted to the shielding film 102, and an ohmmeter 605 is connected to the shielding film 102. An electrode 604 is arranged in the etchant 603 at a position opposing the parent film for air bearing 103 and is connected to the ohmmeter 605 through a covered wire 607. When the work including the substrate 101, the shielding film 102 and the parent film for air bearing 103 is immersed into the etchant 603, etching of the parent film for air bearing 103 starts proceeding. Here, since the parent film for air bearing 103 and the cover 601 are electrically non-conductive, the resistance value measured by the ohmmeter 605 represents the insulation state. When etching of the parent film for air bearing 103 proceeds, the protuberance of the shielding film 102 is exposed to form the exposed portion 107. The shielding film 102, the etchant 603 and the electrode 604 become electrically conductive due to this exposed portion 107 and the resistance value measured by the ohmmeter 605 represents the conduction state. When the work including the substrate 101, the shielding film 102 and the parent film for air bearing 102 is pulled out from the etchant 603 immediately after the ohmmeter 605 represents the conduction state, the surface of the parent film for air bearing 103 so etched and the exposed portion 107, that is, the apex of the shielding film 102, exist on substantially the same plane as shown in FIG. 1C.

Figure 7A:
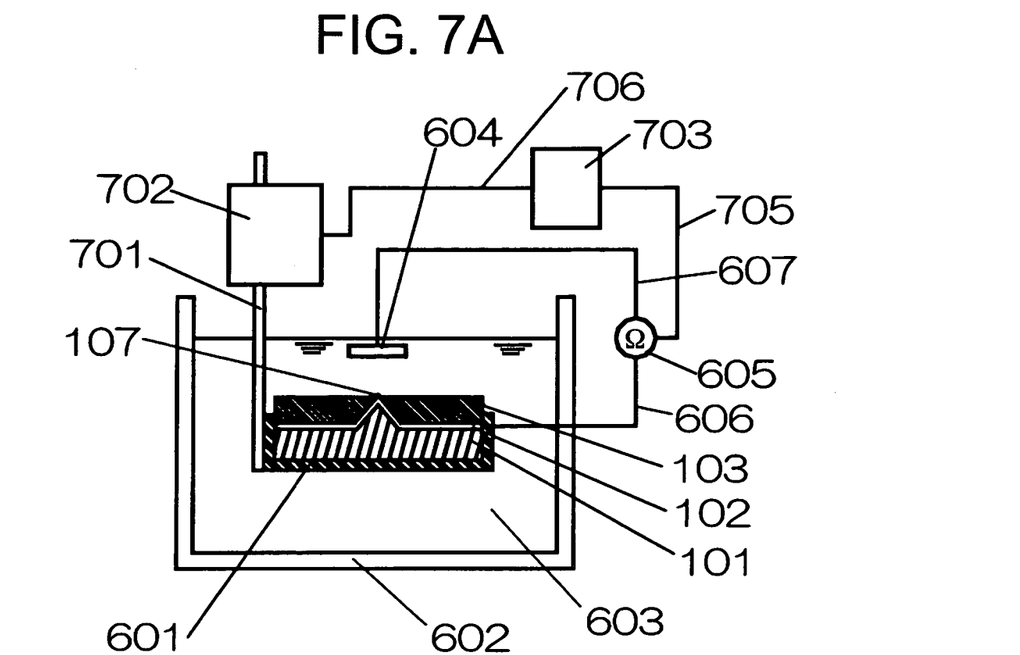
FIG. 7 is a schematic view showing a construction of a production apparatus of a near field optical head according to the invention.

The production apparatus of the near field optical head shown in FIG. 6 may be equipped with a work pull-up mechanism as shown in FIG. 7A. This mechanism includes a pull-up rod 701 mounted on the cover 601, an actuator 702 for pulling up the pull-up rod 701 and a controller 703 for controlling the actuator 702. The actuator 702 and the controller 703 are connected to each other through the wire 706, and the controller 703 and the ohmmeter 605 are connected to each other through a wire 705. When the exposed portion 107 is formed with the progress of etching of the parent film for air bearing 103, the shielding film 102, the etchant 603 and the electrode 604 become electrically conductive and the resistance value measured by the ohmmeter 605 represents the conduction state. Detecting this conduction, the controller 703 gives the pull-up instruction to the actuator 702 to let it pull up the work including the substrate 101, the shielding film 102 and the parent film for air bearing 103 from the etchant 603, and automatically stops etching of the parent film for air bearing 103.

Figure 7B:
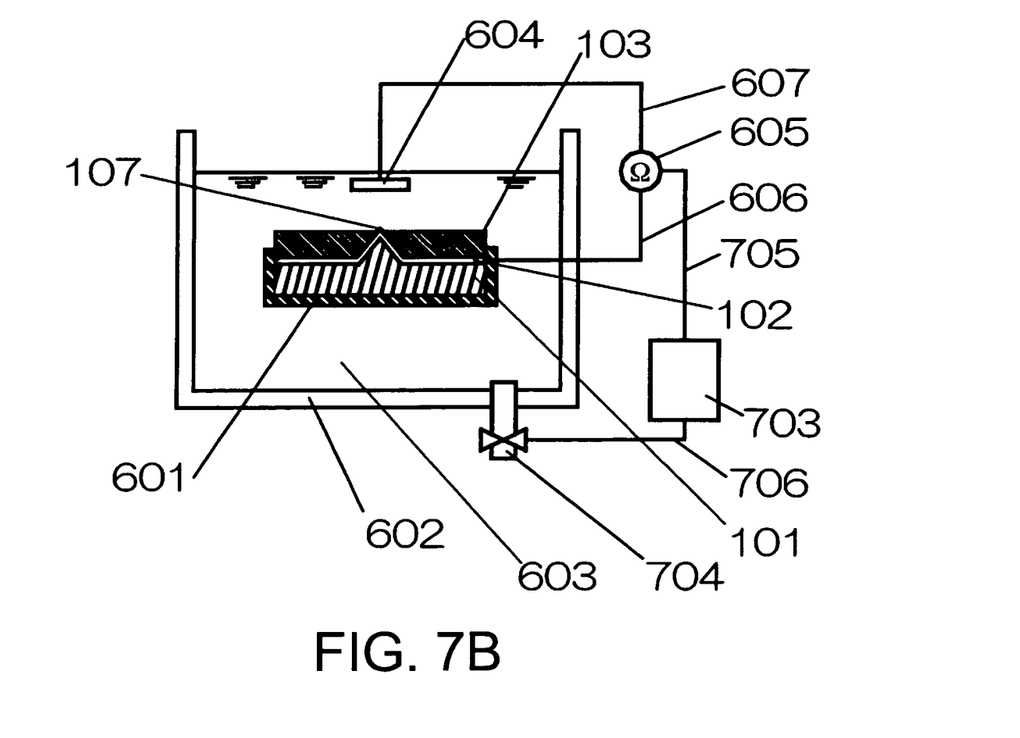

The production apparatus of the near field optical head shown in FIG. 6 may be equipped with an etchant discharge mechanism as shown in FIG. 7B. This mechanism includes a solenoid valve 704 fitted beneath the etching tank 602 and a controller 703 for controlling the solenoid valve 704. The solenoid valve 704 and the controller 703 are connected to each other through a wire 706, and the controller 703 and the ohmmeter 605 are connected to each other through a wire 705. When the exposed portion 107 is formed with the progress of etching of the parent film for air bearing 103, the shielding film 102, the etchant 603 and the electrode 604 become electrically conductive and the resistance value measured by the ohmmeter 605 represents the conduction state. Detecting this conduction, the controller 703 gives the valve-opening instruction to the solenoid valve 704, discharges the etchant 603 from the etching tank 602, and automatically stops etching of the parent film for air bearing 103.

In this embodiment, the shielding film 102 has electric conduction and the exposed portion 107 is formed. Therefore, it is necessary that at least the shielding film 102 is not damaged to such an extent as to lose its function before etching by the etchant 603 is stopped and its function is not deteriorated during processing of the air bearing 105. When gold is used for the shielding film 102, for example, it is possible to use silicon dioxide for the parent film for air bearing 103 and a mixed solution of hydrofluoric acid and ammonium fluoride for the etchant 603. Sputtering or vacuum deposition may be used for forming the gold film. Plasma CVD (chemical vapor deposition) using tetraethylorthosilicate (TEOS) gas can be employed to form the silicon dioxide film of the parent film for air bearing 103. To process the air bearing 105, wet etching by use of the mixed solution of hydrofluoric acid and ammonium fluoride or reactive ion etching (RIE) by use of a carbon fluoride type gas can be used. Both of them do not corrode the shielding film 102 of gold.

As explained above, this embodiment can approximately set the level difference between the apex of the distal end of the aperture 201 and the surface of the air bearing 105 to the thickness of the shielding film 102, and can also set the deviation of this level difference to a value smaller than that of the conventional method. Therefore, this embodiment can produce the near field optical heads having uniform quality at a higher speed and a lower cost than the conventional methods.

The near field optical head can be produced at further higher speed and lower cost by providing an automation mechanism such as the work pull-up mechanism shown in FIG. 7A and the etchant discharge mechanism shown in FIG. 7B to the near field optical head production apparatus shown in FIG. 6.

The embodiment explained above relates to the near field optical head using the optical fine aperture. However, the embodiment can produce a near field optical head using a fine protuberance in substantially the same way as described above with the exception that the shielding film and the aperture are not formed.

Figure 11:
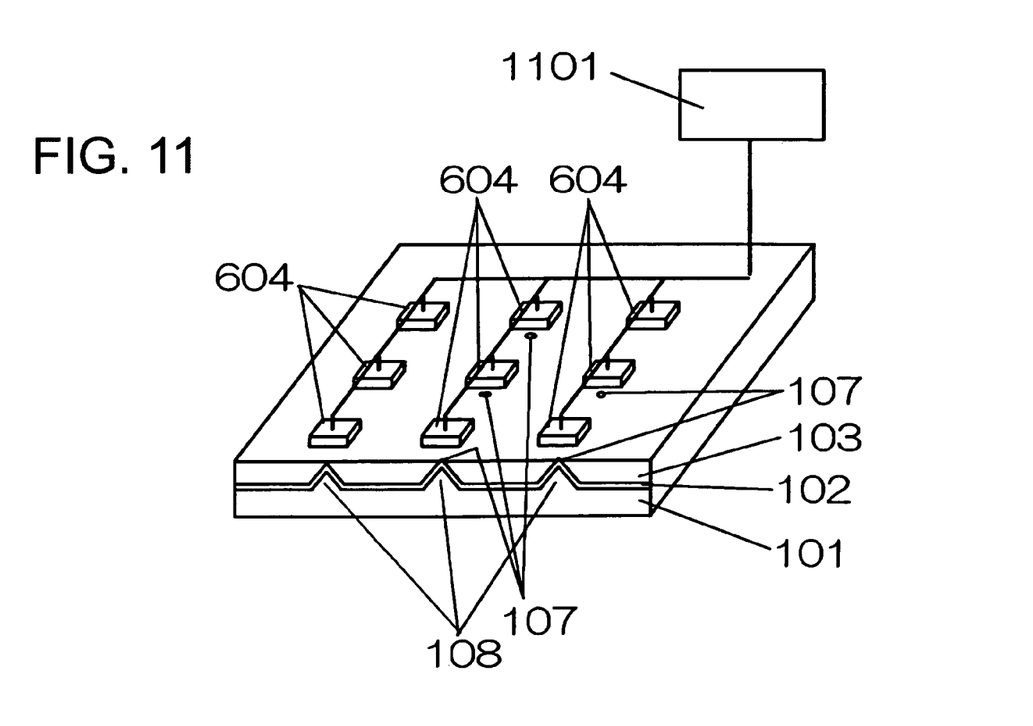
FIG. 11 is a schematic view showing a construction of a production apparatus of a near field optical head according to the invention.

Though the near field optical head as the work is only one in the embodiment explained above, a plurality of near field optical heads can be collectively fabricated in the construction shown in FIG. 11. After a plurality of protuberances 108 is first formed on the substrate 101, subsequent process steps are carried out in substantially the same way as in the embodiment described above. In etching of the parent film for air bearing 103 that is carried out while the existence/absence of the formation of the exposed portion 107 is monitored, a plurality of electrodes 604 is so arranged inside the etchant 603 (not shown in the drawing) as to respectively oppose a plurality of protuberances 108. The construction in which the electrodes 604 are connected to a detection circuit 1101 (not shown) and the shielding film 102 is insulated from the etchant 603 (not shown) is the same as that of the embodiment described above.

A plurality of electrodes 604 is arranged and the detection circuit 1101 executes phase detection. Therefore, the existence/absence of the formation of a plurality of exposed portions 107 can be monitored. When the formation of a certain exposed portion 107 is confirmed, etching of the discrete near field optical head having this exposed portion 107 is only stopped, and etching of the discrete near field optical head not having the exposed portion 107 yet formed thereon is continued. Because the exposed portion 107 is mechanically closed inside the etchant, it becomes possible to stop etching of only the discrete near field optical head having the exposed portion 107 and to continue etching of the near field optical heads not having the exposed portion 107 yet formed thereon.

As explained above, this embodiment can monitor the existence/absence of the formation of the exposed portion 107 of each discrete near field optical head during etching for forming the exposed portion 107, can independently stop etching and can therefore produce collectively a plurality of near field optical heads on one substrate. Consequently, this embodiment can produce large quantities of near field optical heads having uniform quality at a higher speed and a lower cost than ever.

[Embodiment 2]

Figure 9:
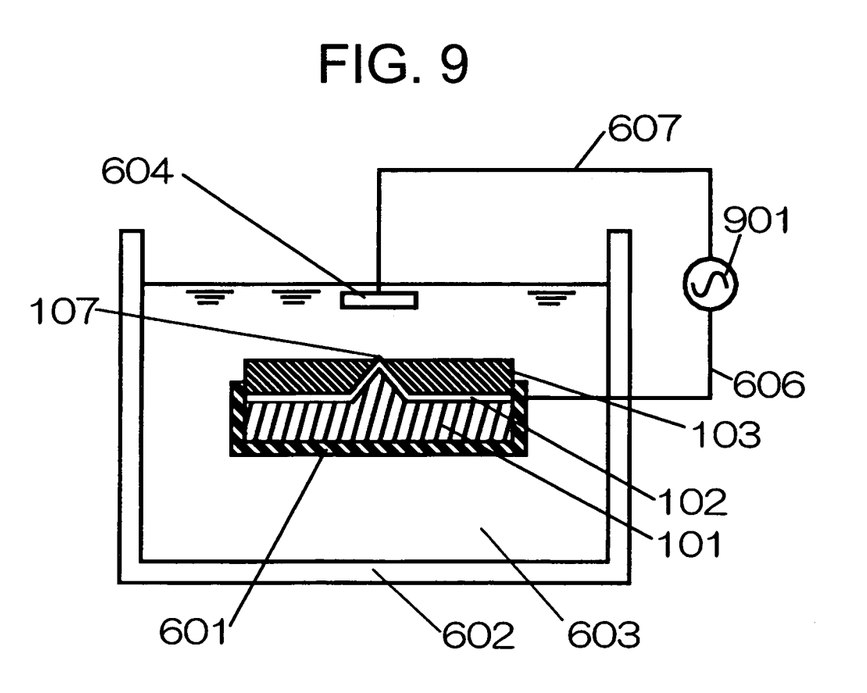
FIG. 9 is a schematic view showing a production method of a near field optical head according to Embodiment 2 of the invention.

FIG. 9 shows a production apparatus of a near field optical head according to Embodiment 2 of the invention.

This embodiment is substantially the same as Embodiment 1 but is different in its detection method of the exposed portion 107. In other words, this embodiment uses an impedance meter 901 in place of the ohmmeter 605 used in Embodiment 1.

The etchant 603 etches the parent film for air bearing 103. Because the parent film for air bearing 103 and the cover 601 do not pass electricity in an initial stage, the shielding film 102 and the etchant 603 are electrically insulated from each other. Here, the parent film for air bearing 103 operates as a capacitance existing between the electrode 604 and the shielding film 102. When the film thickness of the parent film for air bearing 103 varies with the progress of etching, the capacitance value varies. Therefore, the etching amount of the parent film for air bearing 103 can be detected through the impedance meter 901. As etching of the parent film for air bearing 103 proceeds, the protuberance of the shielding film 102 is exposed, forming the exposed portion 107. The exposed portion 107 electrically connects the shielding film 102, the etchant 603 and the electrode 604 to one another with the result that the impedance measured by the impedance meter 901 drops and the formation of the exposed portion 107 is detected. As soon as the formation of the exposed portion 107 is detected, the work including the substrate 101, the shielding film 102 and the parent film for air bearing 103 is quickly pulled out from the etchant 603. As a result, the surface of the parent film for air bearing 103 so etched and the exposed portion 107, that is, the apex of the shielding film 102, exist on substantially the same plane.

Needless to say, this embodiment may be equipped, too, with the work pull-up mechanism of Embodiment 1 shown in FIG. 7A and with the etchant discharge mechanism shown in FIG. 7B.

In this embodiment, too, a plurality of near field optical heads can be similarly and simultaneously produced on one substrate by use of the construction of Embodiment 1 shown in FIG. 11. In consequence, large quantities of near field optical heads having uniform quality can be produced at a higher speed and a lower cost than ever.

As explained above, this embodiment can detect the etching amount of the parent film for air bearing and can grasp the process to the detection of the exposed portion 107. In comparison with Embodiment 1, therefore, this embodiment can more stably set the difference of height between the apex of the distal end of the aperture 201 and the surface of the air bearing 105 to the value approximate to the thickness of the shielding film 102. Because this embodiment can further reduce variance of the height difference, this embodiment can produce the near field optical heads having uniform quality at a higher speed and a lower cost than ever.

[Embodiment 3]

Figure 10:
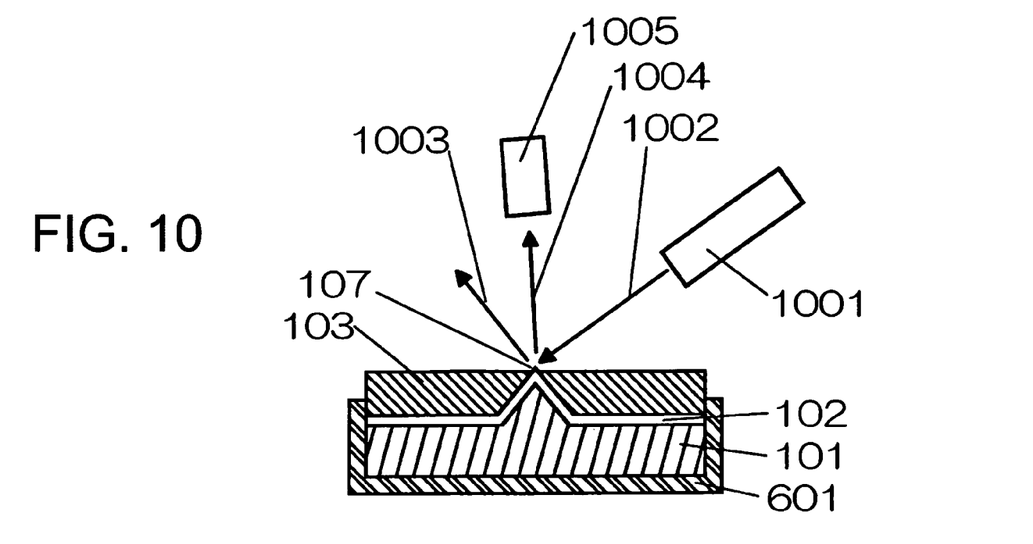
FIG. 10 is a view showing a production method of a near field optical head according to Embodiment 3 of the invention.

FIG. 10 shows a production apparatus of a near field optical head according to Embodiment 3 of the invention.

This embodiment is substantially the same as Embodiment 1 but is different in its detection method of the exposed portion 107.

A laser beam source 1001 generates an incident beam 1002. The incident beam 1002 is reflected on the surface of the parent film for air bearing 103 to generate a reflected beam 1003. As etching of the parent film for air bearing 103 proceeds and the exposed portion 107 is formed, the incident beam 1002 irradiated to the exposed portion 107 generates not only the reflected beam 1003 but also a scattered beam 1004 due to the exposed portion 107. An optical detector 1005 detects the scattered beam 1004 and can thus detect the formation of the exposed portion 107. When etching of the parent film for air bearing 103 is stopped immediately after the detection of the formation of the exposed portion 107, the surface of the parent film for air bearing 103 etched and the exposed portion 107, that is, the apex of the shielding film 102, exist on substantially the same plane.

This embodiment, too, may be of course equipped with automation mechanisms such as the work pull-out mechanism of Embodiment 1 shown in FIG. 7A and with the etchant discharge mechanism shown in FIG. 7B.

It is obvious that in this embodiment, too, a plurality of near field optical heads can be produced simultaneously on one substrate by arranging a plurality of laser beam sources 1001 and a plurality of optical detectors 1005, or by scanning the laser beam source 1001 and the optical detector 1005. Consequently, this embodiment can produce large quantities of near field optical heads having uniform quality at a higher speed and a lower cost than ever.

As explained above, this embodiment can acquire the same effects as that of Embodiment 1 by using the shielding film 102 not having electric conduction, too.

[Embodiment 4]

FIG. 2 is a sectional view showing a production method of a near field optical head according to Embodiment 4 of the invention.

Figure 2A:
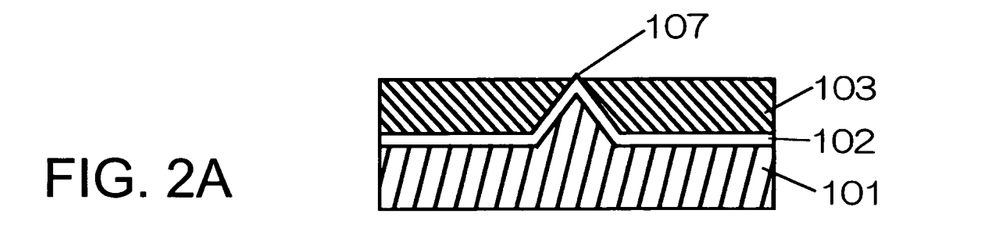
FIG. 2 is a sectional view showing a production method of a near field optical head according to Embodiment 4 of the invention.

The process step up to FIG. 2A for forming the exposed portion 107 by etching the parent film for air bearing 103 is the same as the step up to FIG. 1B in Embodiment 1. The production apparatus of the near field optical head shown in FIG. 6 or 7 is used for etching the parent film for air bearing 103 in the same way as in Embodiment 1.

Figure 2B:
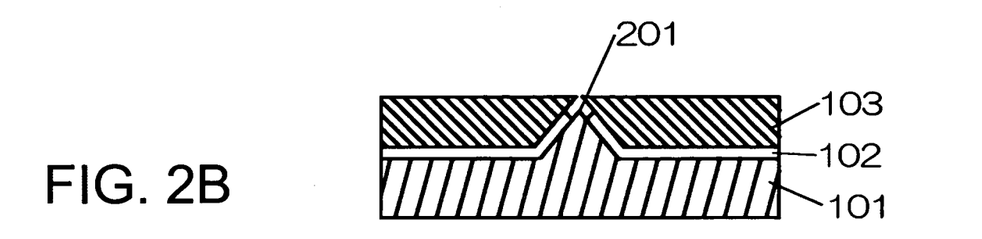

The shielding film 102 in this embodiment is made of a material that can be etched by the etchant 603 for etching the parent film for air bearing 103 unlike Embodiment 1, and its etching rate is greater than that of the parent film for air bearing 103. Therefore, etching of the shielding film 102 proceeds more quickly with the exposed portion 107 as the starting point than etching of the parent film for air bearing 103 simultaneously with the formation of the exposed portion 107. As etching of the shielding film 102 proceeds, the apex of the protuberance 108 is optically exposed as shown in FIG. 2B, thereby forming the aperture 201.

Figure 2C:
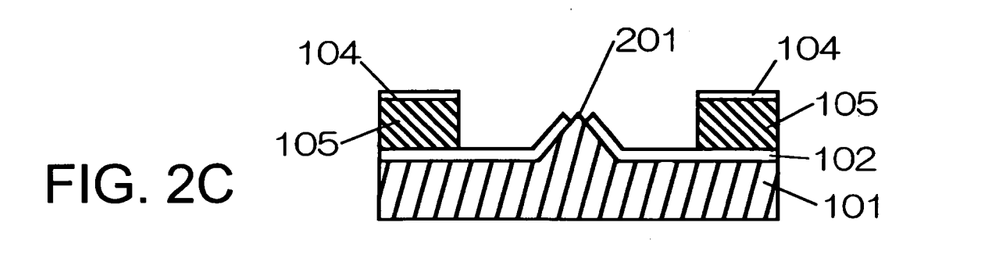

The parent film for air bearing 103 is processed after the aperture 201 is formed, to form the air bearing 105 as shown in FIG. 2C. Photo-application can be employed for processing the parent film for air bearing 103. The air bearing 105 is formed when the parent film for air bearing 103 is etched by an etching method that does not deteriorate the function of the shielding film 102 with the patterned resist 104 as the etching mask.

Figure 2D:
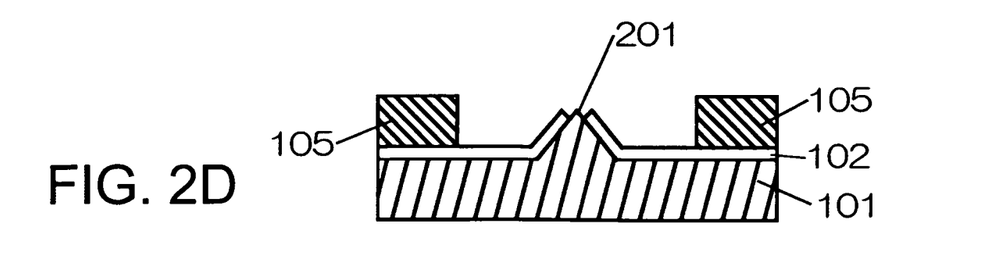

After the resist 104 is removed, the near field optical head shown in FIG. 2D can be completed.

Here, the steps shown in FIGS. 2A to 2B will be explained in detail with reference to FIG. 6. The production apparatus of the near field optical head shown in FIG. 6 is used for etching the parent film for air bearing 103 as described previously. The construction of this apparatus is explained in Embodiment 1. In the production apparatus of the near field optical head shown in FIG. 6, the exposed portion 107 shown in FIG. 2A is formed with the progress of etching of the parent film for air bearing 103 and the ohmmeter 605 indicates the conduction state in the same way as described above.

In this embodiment, the shielding film 102 is made of the material that can be etched by the etchant 603 and its etching rate is greater than the etching rate of the parent film for air bearing 103 by the etchant 603. Therefore, etching of the shielding film 102 proceeds more quickly with the exposed portion 107 as the starting point than etching of the parent film for air bearing 103 simultaneously with the formation of the exposed portion 107. As etching of the shielding film 102 proceeds, the apex of the protuberance 108 is optically exposed as shown in FIG. 2B, thereby forming the aperture 201. Since the shielding film 102 and the etchant 603 keep electric conduction with each other during the course of etching of the shielding film 102, the ohmmeter 605 keeps indicating the conduction state. The work including the substrate 101, the shielding film 102 and the parent film for air bearing 103 is quickly pulled up from the etchant 603 generally after several to dozens of seconds from the indication of the conduction state by the ohmmeter 605 though the pull-out timing varies with the etching rate of the shielding film 102 by the etchant 603 and with the thickness of the shielding film 102. The size of the aperture 201 in this case is from several nm to the diffraction limit of the wavelength of the beam passing through the substrate 101 and the protuberance 108.

The production apparatus of the near field optical head shown in FIG. 6 may be equipped with the work pull-up mechanism as shown in FIG. 7A in the same way as in Embodiment 1. The construction of this mechanism and its operation are substantially the same as those of the mechanism of Embodiment 1 but is different in the following point. In other words, after the exposed portion 107 is formed with the progress of etching of the parent film for air bearing 103 and the ohmmeter 605 detects conduction, the pull-up instruction is given to the actuator 702 after the passage of the formation time of the aperture 201 with the progress of etching of the shielding film 102, generally from several to dozens of seconds. When the pull-up instruction is given to the actuator 702, the work including the substrate 101, the shielding film 102 and the parent film for air bearing 103 is pulled up from the etchant 603 and etching of the parent film for air bearing 103 and the shielding film 102 is automatically stopped.

The production apparatus of the near field optical head shown in FIG. 6 may be equipped with the etchant discharge mechanism in the same way as in Embodiment 1 shown in FIG. 7B. The construction of this mechanism and its operation are substantially the same as those in Embodiment 1. However, the difference resides in that the valve opening instruction to open the solenoid valve is given after the passage of a time from the formation of the exposed portion 107 with the progress of etching of the parent film for air bearing 103 and the detection of conduction by the ohmmeter 605 to the formation of the aperture 201 with the progress of etching of the shielding film 102, generally several to dozens of seconds. In consequence, the etchant 603 is discharged from the etching tank 602 and etching of the parent film for air bearing 103 and the shielding film 102 is automatically stopped.

It is necessary in this embodiment that the shielding film 102 has electric conduction, is etched by the etchant 603 but does not extinguish at the time of processing of the air bearing 105. When aluminum is used for the shielding film 102, for example, it is possible to use silicon dioxide for the parent film for air bearing 103 and a mixed solution of hydrofluoric acid and ammonium fluoride as the etchant 603. Sputtering and vacuum deposition can be employed for forming the aluminum film. A plasma enhanced CVD (Chemical Vapor Deposition) method using a tetraethylorthosilicate (TEOS) gas can be employed for forming the silicon dioxide film of the parent film for air bearing 103. To process the air bearing 105, reactive ion etching (RIE) using a carbon fluoride type gas can be used, and does not corrode the shielding film 102.

As explained above, this embodiment can carry out simultaneously the step of partially removing the apex of the protuberance of the shielding film 102 and forming the aperture with the step of etching the parent film for air bearing 103 that are separately necessary in Embodiment 1. Therefore, this embodiment can more simply produce the near field optical head.

The height difference between the distal end of the aperture 201 and the surface of the air bearing 105 can be brought approximately to the thickness of the shielding film 102 and variance of the height difference is smaller than that of the prior art methods. This embodiment can produce the near field optical heads having uniform quality at a higher speed and a lower cost than ever.

The production apparatus of the near field optical head shown in FIG. 6 may be equipped with automation mechanisms such as the work pull-up mechanism shown in FIG. 7A and with the etchant discharge mechanism shown in FIG. 7B, and can form automatically and collectively the apertures at a higher speed and a lower cost.

In the embodiment described above, the occurrence of the exposed portion 107 is detected as the change of the electric resistance, but the change of the impedance and the occurrence of the scattered beam can be used for detection in the same way as Embodiment 2 and Embodiment 3.

It is obvious that in this embodiment, too, a plurality of near field optical heads can be produced simultaneously on one substrate as stated in the first to third aspects of the invention. In consequence, large quantities of near field optical heads having uniform quality can be produced at a higher speed and a lower cost than ever.

[Embodiment 5]

FIG. 3 is a sectional view showing a production method of a near field optical head according to Embodiment 5 of the invention.

The process step up to FIG. 3A for forming the exposed portion 107 by etching the parent film for air bearing 103 is substantially the same as the step up to FIG. 1C in Embodiment 1 but is different in the following point.

When the exposed portion 107 is formed with the progress of etching of the parent film for air bearing 103, etching of the parent film for air bearing 103 is quickly stopped in Embodiment 1. In this embodiment, however, etching of the parent film for air bearing 103 is continued even after the exposed portion 107 is formed. The shielding film 102 in this embodiment uses a material that is not damaged to such an extent as to spoil the function of at least the shielding film 102 during the period from the formation of the exposed portion 107 to the stop of etching of the parent film for air bearing 103. When the shielding film 102 is made of the material that is not etched by the etchant of the parent film for air bearing 103, etching of the parent film for air bearing 103 is continued even after the exposed portion 107 is formed. The etching amount of the parent film for air bearing 103 is substantially equal to the thickness of the shielding film 102. In other words, the surface 301 of the parent film for air bearing 103 on the planar portion of the substrate 101 and the apex of the protuberance 108 covered with the shielding film 102 exist on substantially the same plane.

Here, the same effect can be obtained when etching of the parent film for air bearing 103 is quickly stopped immediately after the formation of the exposed portion 107 and etching of the parent film for air bearing 103 is separately made through reactive ion etching (RIE) and the like. Needless to say, this etching does not corrode the shielding film 102, either. This method is effective as means for avoiding damage of the shielding film 102 when the shielding film 102 is damaged to a certain extent during the period from the formation of the exposed portion 107 to the stop of etching of the parent film for air bearing 103.

Figure 3A:
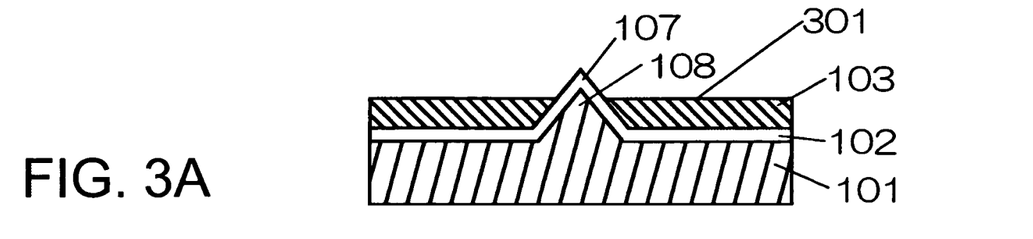
FIG. 3 is a sectional view showing a production method of a near field optical head according to Embodiment 5 of the invention.
Figure 3B:
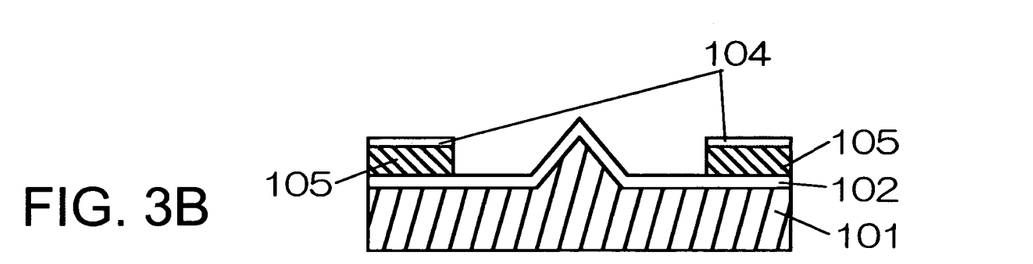

The parent film for air bearing 103 is thereafter processed to give the air bearing 105 as shown in FIG. 3B. Photo-application can be employed for processing the parent film for air bearing 103. The air bearing 105 can be formed when the parent film for air bearing 103 is etched by an etching method that does not extinguish the shielding film 102 with the patterned resist 104 as the etching mask.

Figure 3C:
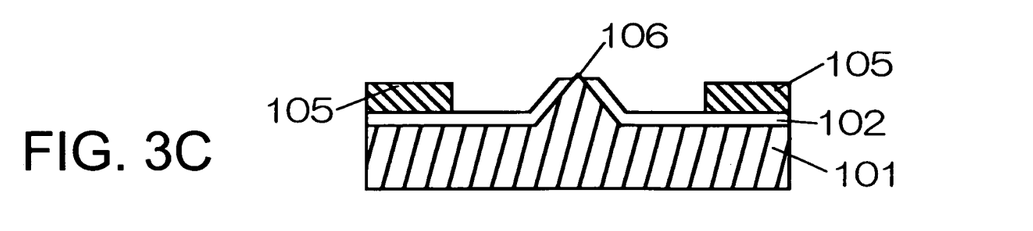

After the resist 104 is removed, the apex of the protuberance of the shielding film 102 is partially removed. In consequence, the protuberance 108 is optically exposed to form the aperture 106 as shown in FIG. 3C. The size of the aperture 106 is from several nm to the limit of diffraction of the wavelength of the beam passing through the substrate 101 and through the protuberance 108. To partially remove the apex of the protuberance of the shielding film 102, it is possible to employ a method using a focused ion beam (FIB) or a method that pushes a hard flat sheet to the apex, of the protuberance of the shielding film 102 and allows the shielding film 102 to undergo plastic deformation.

Next, the process step up to FIG. 3A will be explained in detail with reference to FIG. 6. The production apparatus of the near field optical head shown in FIG. 6 is used for etching the parent film for air bearing 103 as described previously. The construction of this apparatus is explained in Embodiment 1. In the production apparatus of the near field optical head shown in FIG. 6, the exposed portion 107 is formed with the progress of etching of the parent film for air bearing 103 and the ohmmeter 605 indicates the conduction state in the same way as described above.

The shielding film 102 in this embodiment uses a material that is not damaged to such an extent as to spoil the function of at least the shielding film 102 during the period from the formation of the exposed portion 107 to the stop of etching by the etchant 603. When the shielding film 102 is made of the material that is not etched by the etchant 603 of the parent film for air bearing 103, etching of the parent film for air bearing 103 is continued even after the ohmmeter 605 indicates the conduction state. The etching amount of the parent film for air bearing 103 is substantially equal to the thickness of the shielding film 102. In other words, the surface 301 of the shielding film 102 on the planar portion of the substrate 101 and the apex of the protuberance 108 covered with the shielding film 102 exist on substantially the same plane as shown in FIG. 3A.

Here, the same effect can be obtained when the work including the substrate 101, the shielding film 102 and the parent film for air bearing 103 is quickly pulled up from the etchant 603 immediately after the indication of the conduction state by the ohmmeter 605 and the parent film for air bearing 103 is etched separately through reactive ion etching (RIE) and the like. Needless to say, this etching does not corrode the shielding film 102, either. This method is effective in etching of the parent film for air bearing 103 by the etchant 603 as means for avoiding damage of the shielding film 102 when the shielding film 102 is damaged to a certain extent during the period from the formation of the exposed portion 107 to the stop of etching by the etchant 603.

The production apparatus of the near field optical head shown in FIG. 6 may be equipped with the work pull-up mechanism shown in FIG. 7A and with the etchant discharge mechanism shown in FIG. 7B. Needless to say, the controller 703 of each of these mechanisms must be set appropriately in accordance with the time from the formation of the exposed portion 107 to the stop of etching by the etchant 603.

The shielding film 102 in this embodiment has electric conduction and must not be damaged to such an extent as to spoil the function of at least the shielding film 102 during the period from the formation of the exposed portion 107 to the stop of etching by the etchant 603 and also during processing of the air bearing 105. When gold is used for the shielding film 102, for example, it is possible to use silicon dioxide for the parent film for air bearing 103 and a mixed solution of hydrofluoric acid and ammonium fluoride as the etchant 603. Sputtering and vacuum deposition can be employed for forming the gold film. A plasma enhanced CVD (Chemical Vapor Deposition) method using a tetraethylorthosilicate (TEOS) gas can be employed for forming the silicon dioxide film of the parent film for air bearing 103. To process the air bearing 105, wet etching by use of the mixed solution of hydrofluoric acid and ammonium fluoride and reactive ion etching (RIE) using a carbon fluoride type gas can be used, and both do not corrode the shielding film 102 made of gold.

As explained above, this embodiment can easily form the surface of the air bearing 105 and the fine aperture 106 on substantially the same plane and can suppress dimensional variance among the products. Therefore, the embodiment can produce the near field optical heads having uniform quality at a higher speed and a lower cost than ever.

The production speed and the production cost can be further improved when the work pull-up mechanism shown in FIG. 7A and the etchant discharge mechanism shown in FIG. 7B are provided to the production apparatus of the near field optical head shown in FIG. 6.

In the embodiment described above, the occurrence of the exposed portion 107 is detected as the change of the electric resistance, but the change of the impedance and the occurrence of the scattered beam can be used for detection in the same way as Embodiment 2 and Embodiment 3.

It is obvious that in this embodiment, too, a plurality of near field optical heads can be produced simultaneously on one substrate as stated in the first to third aspects of the invention. In consequence, large quantities of near field optical heads having uniform quality can be produced at a higher speed and a lower cost than ever.

Though the embodiment given above explains the near field optical head using the optical fine aperture, the near field optical head using the fine protuberance can be produced, too, by use of a method substantially the same as the method described above with the exception that the shielding film and the aperture are not formed.

[Embodiment 6]

FIGS. 4 and 5 are sectional views each showing a production method of a near field optical head according to Embodiment 6 of the invention.

Figure 4A:
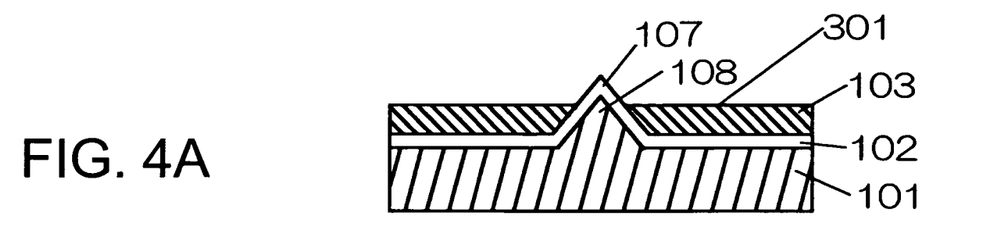
FIG. 4 is a sectional view showing a production method of a near field optical head according to Embodiment 6 of the invention.

The process step up to FIG. 4A for forming the exposed portion 107 by etching the parent film for air bearing 103 is the same as the step up to FIG. 3A in Embodiment 5. The production apparatus of the near field optical head shown in FIGS. 6 and 7 is used for etching the parent film for air bearing 103 in the same way as in Embodiment 5.

Figure 4B:
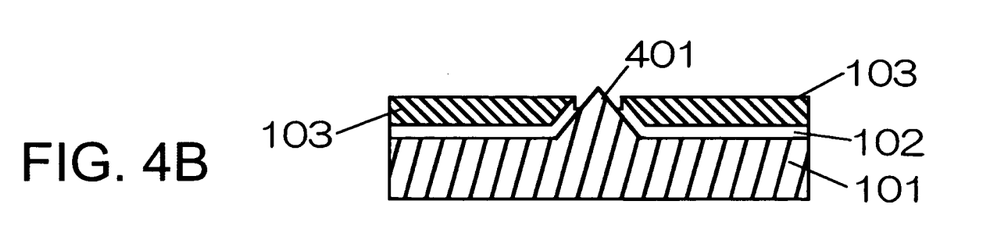

After the exposed portion 107 shown in FIG. 4A is formed, the shielding film 102 is etched with the parent film for air bearing 103 as the etching mask as shown in FIG. 4B. Because the parent film for air bearing 103 does not cover the shielding film 102 at the exposed portion 107, only the apex of the protuberance of the shielding film 102 can be selectively etched. To conduct etching, wet etching or dry etching such as reactive ion etching (RIE) can be used. As etching of the shielding film 102 proceeds, the protuberance 108 is optically exposed to form the aperture 401. The size of the aperture 401 is from several nm to the diffraction limit of the wavelength of the beam passing through the substrate 101 and the protuberance 108.

Figure 4C:
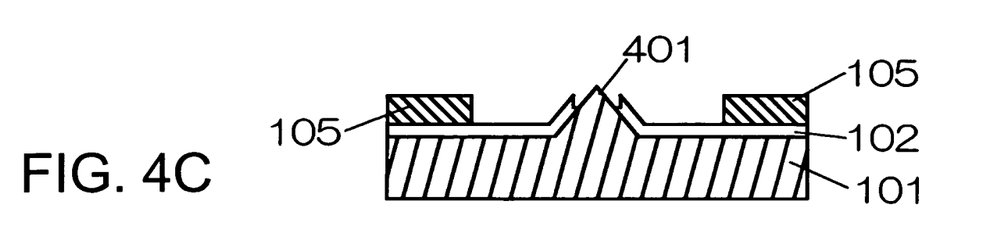

After the aperture 401 is formed, the parent film for air bearing 103 is processed to form the air bearing 105 as shown in FIG. 4C. The near field optical head can be thus completed. Photo-application can be employed for processing the parent film for air bearing 103. An etching method that does not spoil the function of the shielding film 102 must be used for etching the parent film for air bearing 103.

Figure 5A:
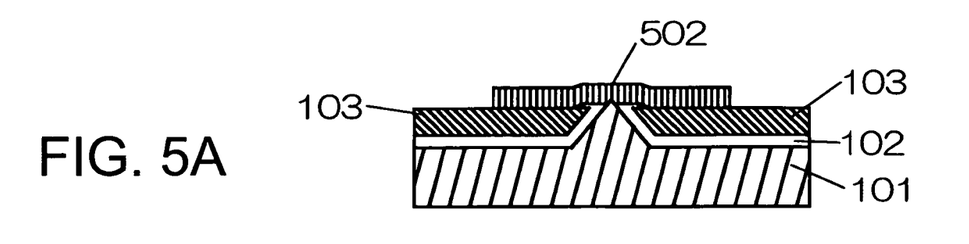
FIG. 5 is a sectional view showing a production method of a near field optical head according to Embodiment 6 of the invention.
Figure 5B:
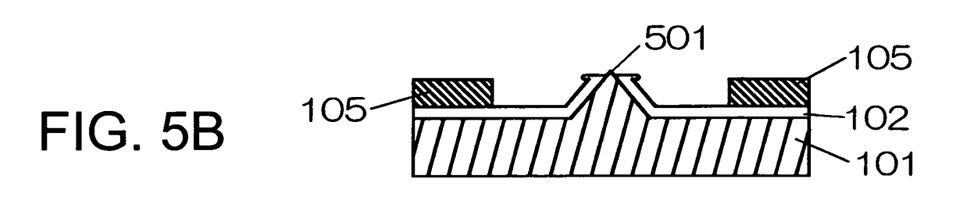

When the flat sheet 502 is pushed to the apex of the protuberance of the shielding film 102 so as to let the shielding film 102 undergo plastic deformation as shown in FIG. 5A instead of etching of the shielding film 102, the substrate 101 is exposed and the aperture 501 shown in FIG. 5B can be formed. The flat sheet 502 is sufficiently hard to cause plastic deformation of the shielding film 102 and has flexibility. Here, because the parent film for air bearing 103 exists in the periphery of the protuberance of the shielding film 102, the fine aperture 501 can be easily obtained without excessively pushing the hard flat sheet.

As explained above, this embodiment can form the fine aperture by far easily than the prior art methods.

In the method of forming the aperture shown in FIG. 4, the aperture is formed through etching in the same way as in Embodiment 2, and the fine, aperture can be formed more easily and at a higher speed and a lower cost than the prior art methods. Moreover, unlike Embodiment 2, this embodiment can freely select the thickness of the air bearing 105 and can easily form the surface of the air bearing 105 and the fine aperture 106 on substantially the same plane.

The method of forming the aperture shown in FIG. 5 pushes the flat sheet to the apex of the protuberance of the shielding film 102 to form the aperture in the same way as in Embodiments 1 and 5. Therefore, this embodiment can form the fine aperture more easily and at a higher speed and a lower cost than the prior art methods. Moreover, unlike Embodiments 1 and 3, this embodiment can form further easily the fine aperture without excessively pushing the hard flat sheet because the parent film for air bearing 103 exists in the periphery of the protuberance of the shielding film 102.

This embodiment can easily form the surface of the air bearing 105 and the fine aperture 106 on substantially the same plane and can suppress dimensional variance among the products. Therefore, the embodiment can produce the near field optical heads having uniform quality at a higher speed and a lower cost than ever.

The production speed and the production cost can be further improved when the work pull-up mechanism shown in FIG. 7A and the etchant discharge mechanism shown in FIG. 7B are provided to the production apparatus of the near field optical head shown in FIG. 6.

It is obvious that in this embodiment, too, a plurality of near field optical heads can be produced simultaneously on one substrate as stated in the fifth aspect of the invention. In consequence, large quantities of near field optical heads having uniform quality can be produced at a higher speed and a lower cost than ever.

Though the foregoing embodiments explain the near field optical head using the optical fine aperture, the near field optical head using the fine protuberance can also be produced by use of a method substantially the same as the methods of the foregoing embodiments with the exception that the shielding film and the aperture are not formed.

As explained above, the invention can control more accurately and more easily the height difference between the optical aperture or the protuberance and the surface of the air bearing than the prior art technologies, and can therefore produce the near field optical heads having uniform quality at a higher speed and a lower cost.

The invention can precisely grasp the predetermined etching amount during etching of the parent film for air bearing by use of the production apparatus of the near field optical head. Therefore, the invention can set accurately and easily the height difference between the apex at the distal end of the aperture and the surface of the air bearing to the thickness of the shielding film.

In addition, because the invention can grasp the change of the etching amount during etching of the parent film for air bearing, the invention can set more accurately and more easily the height difference between the apex at the distal end of the aperture and the surface of the air bearing to the thickness of the shielding film.

The invention can accurately grasp the predetermined etching amount during etching of the parent film for air bearing even when the shielding film does not have electric conduction. Therefore, the invention can set accurately and easily the height difference between the apex at the distal end of the aperture and the surface of the air bearing to the thickness of the shielding film.

In addition, because the invention can add etching of the parent film for air bearing to about the thickness of the shielding film, the invention can accurately and easily form the surface of the air bearing and the fine aperture on substantially the same plane. Because the invention can change the additional etching amount of the parent film for air bearing, the invention can select the relative height between the air bearing and the aperture.

In a recording/reproduction apparatus utilizing near filed light, its optical resolution greatly depends on a proximity distance. Because of the features described above, the aperture and the protuberance can be brought close to the medium in a distance of about a float-up amount of the head in the near field optical head of the invention. Therefore, the near field optical head of the invention can acquire high optical resolution.

According to the invention, the step of removing partially the apex of the protuberance of the shielding film and forming the aperture can be carried out simultaneously with the step of etching the parent film for air bearing. Therefore, the invention can more easily produce the near field optical head.

According to the invention, etching is used to form the aperture. Therefore, the invention can form the fine aperture more easily and at a higher speed and lower cost than the prior art methods. Moreover, the invention can freely select the thickness of the air bearing and can form easily the surface of the air bearing and the fine aperture on substantially the same plane.

When the flat sheet is pushed to the apex of the protuberance of the shielding film to form the aperture in the invention, the parent film for air bearing exists in the periphery of the protuberance of the shielding film. Therefore, the invention can easily and accurately form the fine aperture without pushing excessively the hard flat sheet.

The production can be made at a higher speed and a lower cost in the invention when the automation mechanisms such as the work pull-up mechanism and the etchant discharge mechanism are provided.

The invention can simultaneously produce a plurality of near field optical heads on one substrate and can therefore produce large quantities of near field optical heads having uniform quality at a higher speed and a lower cost than ever.

What is claimed is:

1. A production apparatus for producing a near field optical head that includes, during its production process, a substrate, a protuberance extending from a surface of the substrate, an electrically conductive shielding film covering the protuberance and the substrate, and a parent film, as a mother material for an air bearing, covering the shielding film, the production apparatus comprising:
a conductive etchant for etching the parent film to expose a portion of the protuberance corresponding to an apex of the shielding film so that the exposed apex protrudes from a surface of the parent film or lies on a common plane with the surface of the parent film;
a container for storing the etchant and for containing the substrate, the shielding film, and the parent film so that the substrate, the shielding film, and the parent film are immersed in the etchant while the substrate and the shielding film are insulated from the etchant during etching of the parent film;
a single electrode mounted in the container so as to be immersed in the etchant and disposed over the parent film, the electrode being electrically connected to the shielding film by an electrical connection passing via an exterior of the container; and
measuring means for measuring an electrical characteristic between the electrode and the shielding film, the measuring means including stopping means for stopping etching of the parent film in accordance with the measured electrical characteristic corresponding to a conduction state in which the shielding film, the etchant, and the electrode become electrically conductive due to the exposed apex of the shielding film.

2. A production apparatus according to claim 1; wherein the measuring means comprises an impedance meter for measuring impedance between the electrode and the shielding film.

3. A production apparatus according to claim 2; further comprising a cover for supporting the substrate, the shielding film and the parent film immersed in the etchant within the tank, and for covering and insulating the substrate and the shielding film from the etchant to prevent etching of the substrate and the shielding film during etching of the parent film.

4. A production apparatus according to claim 1; wherein the measuring means comprises an impedance meter for measuring impedance between the electrode and the shielding film; and wherein the stopping means stops etching of the parent film by the etchant in accordance with the impedance between the electrode and the shielding film measured by the impedance meter.

5. A production apparatus according to claim 1; further comprising a cover for supporting the substrate, the shielding film and said parent film immersed in the etchant within the tank, and for covering and insulating the substrate and the shielding film from the etchant to prevent etching of the substrate and the shielding film during etching of the parent film.

6. A production apparatus according to claim 1; wherein the measuring means comprises an ohmmeter for measuring electrical resistance between the electrode and the shielding film.

7. A production apparatus for producing a near field optical head that includes, during its production process, a substrate, a protuberance extending from a surface of the substrate, a shielding film covering the protuberance and the substrate, and a parent film, as a mother material for an air bearing, covering the shielding film, the production apparatus comprising:
a conductive etchant for etching the parent film to expose a portion of the protuberance corresponding to an apex of the shielding film so that the exposed apex protrudes from a surface of the parent film or lies on a common plane with the surface of the parent film;
a single electrode configured for immersion into the etchant over the parent film, the electrode being electrically connected to the shielding film by an electrical connection passing via an exterior of a container that contains the etchant; and
measuring means for measuring an electrical characteristic between the electrode and the shielding film, the measuring means including stopping means for stopping etching of the parent film in accordance with the measured electrical characteristic corresponding to a conduction state in which the shielding film, the etchant, and the electrode become electrically conductive due to the exposed apex of the shielding film.

8. A production apparatus according to claim 7; wherein the measuring means comprises an ohmmeter for measuring electrical resistance between the electrode and the shielding film.

9. A production apparatus according to claim 7; wherein the measuring means comprises an impedance meter for measuring impedance between the electrode and the shielding film.

10. A production apparatus according to claim 7; wherein the measuring means comprises an impedance meter for measuring impedance between the electrode and the shielding film; and wherein the stopping means stops etching of the parent film by the etchant in accordance with the impedance between the electrode and the shielding film measured by the impedance meter.

11. A production apparatus according to claim 7; further comprising a cover for covering the substrate and the shielding film to prevent etching of the substrate and the shielding film.

12. A production apparatus according to claim 7; further comprising a container for storing the etchant and for containing the substrate, the shielding film, and the parent film so that the substrate, the shielding film, and the parent film are immersed in the etchant.

13. In combination: a workpiece having a substrate, a protuberance extending from a surface of the substrate, a shielding film covering the protuberance and the substrate, and a parent film covering the shielding film and corresponding to a mother material for an air bearing; and a production apparatus for producing a near field optical head using the workpiece, the production apparatus comprising a conductive etchant for etching the parent film to expose a portion of the protuberance corresponding to an apex of the shielding film so that the exposed apex protrudes from a surface of the parent film or lies on a common plane with the surface of the parent film, a container for containing the etchant, a single electrode configured for immersion into the etchant over the parent film and being electrically connected to the shielding film by an electrical connection passing via an exterior of the container, and measuring means for measuring an electrical characteristic between the electrode and the shielding film, the measuring means including stopping means for stopping etching of the parent film in accordance with the measured electrical characteristic corresponding to a conduction state in which the shielding film, the etchant, and the electrode become electrically conductive due to the exposed apex of the shielding film.

14. A combination according to claim 13; wherein the measuring means comprises an ohmmeter for measuring electrical resistance between the electrode and the shielding film.

15. A combination according to claim 13; wherein the measuring means comprises an impedance meter for measuring impedance between the electrode and the shielding film.

16. A combination according to claim 13; wherein the measuring means comprises an impedance meter for measuring impedance between the electrode and the shielding film; and wherein the stopping means stops etching of the parent film by the etchant in accordance with the impedance between the electrode and the shielding film measured by the impedance meter.

17. A combination according to claim 13; further comprising a cover for covering the substrate and the shielding film to prevent etching of the substrate and the shielding film.

18. A combination according to claim 13, wherein the container is configured to store the substrate, the shielding film, and the parent film so that the substrate, the shielding film, and the parent film are immersed in the etchant.

* * * * *